3,247,167
ORGANO-TIN POLYAMIDES
Emil F. Jason and Ellis K. Fields, Chicago, Ill., assignors to Standard Oil Company, Chicago, Ill., a corporation of Indiana
No Drawing. Filed July 19, 1962, Ser. No. 211,110
4 Claims. (Cl. 260—78)

This invention relates to synthetic polymeric organo-tin compositions and to a method of making the same. More particularly, it relates to tin-containing polyamides.

The polymeric organo-tin compositions of this invention can be generally designated as the condensation products of a diamine, an organo-tin compound and a dicarboxylic acid. More particularly, the tin-containing polyamides of this invention are the condensation products of a diamine and a mixture of a diorgano-tin dihalide and an acyl halide of a dicarboxylic acid of the group consisting of alkanedioic acids having from 2 to 20 carbon atoms, benzene dicarboxylic acids and naphthalene dicarboxylic acids, which mixture contains from 1 to 99 mole percent, preferably 5 to 20 mole percent of the diorgano-tin dihalide.

The tin-containing polyamides of this invention are linear polymers with a small amount of cross-linking wherein tin is an integral part of, and randomly distributed in, the main polymer chain. These compositions exhibit good thermal stability and fire retarding properties and are suitable for use as stabilizers in polyvinyl chloride plastics, as wood preservatives, in the treatment of textiles for imparting insect resistancy and fire retardancy properties thereto, and as surface coatings.

The diamine reactant used in preparing the tin-containing polyamides of this invention are primary amines represented by the formula $$H_2N-R-NH_2$$

wherein R is a divalent alkylene, cycloalkylene, arylene, aralkylene or heterocyclic radical. Such radicals can be unsubstituted or contain unreactive, such as alkyl or aryl, substituents. The diamines which are most suitable are the alpha-omega alkylene diamines containing 4 to 22 carbon atoms, which include tetramethylene diamine, pentamethylene diamine, hexamethylene diamine, 1,12-dodecadiamine, etc. While the preferred alkylene diamines are straight or branched chain, cycloalkane diamines such as 1,4-cyclohexane diamine can be used. Illustrative of the aralkylene diamines are para-amino benzyl amine, para-amino phenethyl amine. The arylene diamines are represented by naphthalene diamine, phenylene diamine. The heterocyclic diamines are those compounds containing nitrogen in the cyclic structure, such as 2,6-diamine pyridine.

The diorgano-tin compound used in preparing the compositions of this invention are the diorgano-tin dihalides represented by the formula

where $R_1$ is a $C_{1-20}$ monovalent radical of the group consisting of alkyl and aryl, and X represents halogen, preferably chlorine and bromine. Illustrative organo-tin compounds are dimethyltin dichloride, ethylmethyltin dichloride, diphenyltin dichloride, isopropyl-2-naphthyltin dichloride, dinaphthyltin dibromide, and dialkyltin dichlorides containing from about 1 to about 20 carbon atoms in each alkyl group.

The dicarboxylic acid reactant is an acyl halide represented by the formula

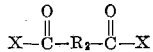

wherein $R_2$ is an alkylene radical having from 2 to about 20 carbon atoms, the phenylene radical and the naphthylene radical; and X represents a halogen, preferably chlorine or bromine. Exemplary of the alkanedioic acids are succinic, adipic and sebacic. The benzene dicarboxylic acids are phthalic, isophthalic and terephthalic acids. Representative of the naphthalene dicarboxylic acids are 1,8-naphthalene dicarboxylic acid, 2,6-naphthalene dicarboxylic acid and 2,7-naphthalene dicarboxylic acid.

The polymeric organo-tin compositions of this invention are prepared by reacting (A) a diamine and (B) a mixture of a diorgano-tin dihalide and an acyl halide from a dicarboxylic acid of the group consisting of alkanedioic acids having from about 2 to 20 carbon atoms, benzene dicarboxylic acids and naphthalene dicarboxylic acids, which mixtures contain from 1 to 99 mole percent of diorgano-tin dihalide in the presence of an aqueous alkali metal hydroxide solution. The alkali metal hydroxide can be sodium hydroxide, potassium hydroxide, lithium hydroxide, with sodium hydroxide being preferred. Inasmuch as this is an interfacial condensation in an aqueous solution with the elimination of halogen from the reactants, the alkali metal hydroxide solution contains at least one mole of alkali metal hydroxide per gram atom of halide present in the reaction mixture. Reactants A and B above are preferably in equimolar proportions. However, an excess of either reactant is possible when additional reaction sites are desired in the reaction product obtained in accordance with this invention.

The interfacial condensation polymerization of this invention is preferably conducted by dissolving the diamine in the aqueous alkali metal hydroxide solution and thereafter adding a mixture of the diorgano-tin dihalide and acyl halide dissolved in an inert organic solvent such as chloroform to the vigorously agitated aqueous diamine alkali metal hydroxide solution at temperatures within the range of from about 0° to about 200° C., preferably 20 to 30° C., and from atmospheric pressure to super-atmospheric pressures of up to about 500 pounds per square inch. At temperatures above 100° C., the reaction should be conducted at super-atmospheric pressures to prevent the loss of water from the reaction medium. The use of elevated temperatures is dependent upon the stability of the reactants. Temperatures below 20° C. reduce the rate of reaction. At room temperature or temperatures within the range of 20 to 30° C., there is maximum reactivity of the reactants with minimal side reactions. The tin-containing polyamide condensation products form immediately as solid materials upon the addition of the diorgano-tin dihalide and acyl halide mixture to the aqueous diamine alkali metal hydroxide solutions. Consequently, it is advisable to slowly add the diorgano-tin dihalide-acyl halide mixture to the aqueous solution. This polycondensation reaction can be effected by simply admixing the reactants in a high-speed blender, such as a "Waring Blendor." Preferentially the solvent solution of mixture B is within the range of 5 to 75% by weight of the reactants and preferably 15 to 30% by weight. The aqueous alkali hydroxide solution preferably contains 5 to 20% by weight of the alkaline metal hydroxide and 5 to 40% by weight of the diamine.

Recovery of the polymeric organo-tin compositions is simply effected by filtering the solids from the reaction mixture. The solids are then washed with water and dried.

The following examples further illustrate the preparation of the tin-containing polyamides of this invention.

Example I

A mixture of 11.6 g. (0.1 mole) of 1,6-hexanediamine, 8.0 g. (0.20 mole) of sodium hydroxide, and 100 ml. of water was placed at room temperature in a "Waring Blendor." To this stirred solution was added a mixture of 4.2 g. (.019 mole) of dimethyltin dichloride, 16.4 g. (0.082 mole) of terephthaloyl chloride in 200 ml. of chloroform. On addition of the organic solution, a heavy fibrous-like product formed. Filtration and drying of the product gave a colorless solid that is stable up to 350° C. at which temperature it slowly decomposed and analyzed 24% tin by emission spectroscopy.

Example II

A solution of 5.8 g. (0.05 mole) of 1,6-hexanediamine and 4.0 g. (0.1 mole) of sodium hydroxide in 50 ml. of water was prepared. To this stirred solution was slowly added a mixture of 7.3 g. (0.04 mole) of adipoyl chloride and 2.1 g. (0.01 mole) of dimethyltin dichloride in 100 ml. of chloroform. The polymeric composition obtained after filtration and drying decomposed at 250° C., and contained 20% tin by emission spectroscopy measurements.

Example III

A solution of 2.9 g. (0.02 mole) of 1,6-hexanediamine and 4.0 g. (0.7 mole) of sodium hydroxide in 100 ml. of water was placed in a "Waring Blendor." To this stirred solution was added a mixture of 0.9 g. (0.002 mole) of diphenyltin dichloride, and 3.6 g. (0.02 mole) of adipoyl chloride in 100 ml. of chloroform. The solids were removed by filtration, washed several times with water and dried. The dry material contained 9.76% tin by emission spectroscopy measurements and softened at 250° C., partially sublimed and melted with decomposition at 265–275° C.

A portion of the polymeric composition of this example was dissolved in hot dimethylformamide to about a 1% solution. A film on tin plate was cast from this solution. The film exhibited excellent adherence and resisted cracking when the tin plate was bent.

Samples of the polymeric compositions of Examples I and II were ignited in a Bunsen flame and found to be self-extinguishing when removed from the flame.

It will be apparent to one skilled in the art that the polymeric organo-tin compositions of this invention are primarily linear tin-containing polyamides having the following groups

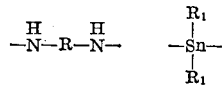

and

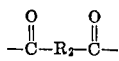

randomly distributed throughout the backbone of the composition.

Thus, having described the invention, what is claimed is:

1. Film- and fiber-forming polyamide compositions containing tin in the polymer chain consisting essentially of the condensation product obtained by reacting under polymerizing conditions at least substantially equimolar proportions of (A) a primary diamine having the formula $$H_2N-R-NH_2$$

wherein R is a divalent radical containing 4 to 22 carbon atoms selected from the group consisting of alkylene, cycloalkylene, arylene, aralkylene and heterocyclic containing nitrogen in the cyclic structure, and (B) a mixture of (a) a diorganotin dihalide having the formula

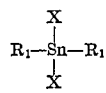

wherein X is halogen, and $R_1$ is a monovalent radical containing 1 to 20 carbon atoms selected from the group consisting of alkyl and aryl, and (b) an acyl halide of a dicarboxylic acid from the group consisting of alkanedioic acids having from 2 to about 20 carbon atoms, benzene dicarboxylic acids and naphthalene dicarboxylic acids, said mixture (B) containing from 1 to 99 mole percent of said diorganotin dihalide, in an aqueous alkali metal hydroxide solution containing at least 1 mole of alkali metal hydroxide per gram atom of halide present in said reaction mixture (B).

2. The composition of claim 1 wherein said diamine is 1,6-hexanediamine, said tin dihalide is dimethyltin dichloride, said acyl halide is adipoyl chloride, and said alkali metal hydroxide is sodium hydroxide.

3. The composition of claim 1 wherein said diamine is 1,6-hexanediamine, said tin dihalide is dimethyltin dichloride, said acyl halide is terephthaloyl chloride, and said alkali metal hydroxide is sodium hydroxide.

4. The composition of claim 1 wherein said diamine is 1,6-hexanediamine, said tin dihalide is diphenyltin dichloride, said acyl halide is adipoyl chloride, and said alkali metal hydroxide is sodium hydroxide.

References Cited by the Examiner

UNITED STATES PATENTS

| | | | |
|---|---|---|---|
| 2,625,536 | 1/1953 | Kirby | 260—78 |
| 2,722,524 | 11/1955 | Speck | 260—78 |
| 2,831,834 | 4/1958 | Magat | 260—78 |
| 2,918,454 | 12/1959 | Graham | 260—78 |
| 2,924,586 | 2/1960 | Lotz et al. | 260—78 |
| 3,067,168 | 12/1962 | Purdon | 260—78 |

FOREIGN PATENTS 1,253,028  12/1960  France.

WILLIAM H. SHORT, *Primary Examiner.*

JOSEPH R. LIBERMAN, *Examiner.*